(12) United States Patent
Stueber

(10) Patent No.: US 8,419,101 B2
(45) Date of Patent: Apr. 16, 2013

(54) RECEIVING ELEMENT, IN PARTICULAR FOR ACCOMMODATING A CONTAINER

(75) Inventor: Thomas Stueber, Trebur (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/131,120

(22) PCT Filed: Nov. 28, 2008

(86) PCT No.: PCT/EP2008/010099
§ 371 (c)(1),
(2), (4) Date: May 25, 2011

(87) PCT Pub. No.: WO2009/077071
PCT Pub. Date: Jun. 25, 2009

(65) Prior Publication Data
US 2011/0285163 A1  Nov. 24, 2011

(30) Foreign Application Priority Data

Dec. 19, 2007  (DE) .......................... 10 2007 061 203
Jun. 19, 2008  (DE) .......................... 10 2008 029 259

(51) Int. Cl.
*B60R 7/04* (2006.01)
(52) U.S. Cl.
USPC .................................... 296/24.34; 296/37.8
(58) Field of Classification Search ............... 296/24.34, 296/37.8; *B60R 7/04*
See application file for complete search history.

(56) References Cited

U.S. PATENT DOCUMENTS

| 2,740,471 A | 4/1956 | Follett |
| 5,779,302 A | 7/1998 | Geier et al. |
| 6,129,237 A | 10/2000 | Miyahara |
| 6,682,116 B1 | 1/2004 | Okumura |
| 2001/0030436 A1 | 10/2001 | Kifer et al. |
| 2004/0016859 A1 | 1/2004 | Nishizawa |
| 2004/0118860 A1 | 6/2004 | Leopold et al. |

(Continued)

FOREIGN PATENT DOCUMENTS

| DE | 19616774 A1 | 11/1997 |
| DE | 19808381 A1 | 9/1999 |

(Continued)

OTHER PUBLICATIONS

German Patent Office, German Search Report for German Application No. 102007061203.8, dated Feb. 26, 2009.

(Continued)

*Primary Examiner* — Dennis Pedder
(74) *Attorney, Agent, or Firm* — Ingrassia Fisher & Lorenz, P.C.

(57) ABSTRACT

A receiving element is provided, in particular for motor vehicles, with a housing open at the top for accommodating at least one container. The housing has at least one lateral clamping element. In such a receiving element, it is proposed that the housing incorporate at least one foldable support, which in a first lockable position is spaced apart from and arranged parallel to the floor, and in a second position is arranged essentially perpendicular to the floor, and further that the respective clamping element is arranged above the support relative to its first position. Such a receiving element has a relatively large, variable tray area. It is also used for reliably accommodating at least one container, which can vary in size.

9 Claims, 8 Drawing Sheets

U.S. PATENT DOCUMENTS

| | | |
|---|---|---|
| 2006/0027722 A1 | 2/2006 | Hoshi |
| 2006/0037984 A1 | 2/2006 | Misumi |
| 2007/0145760 A1* | 6/2007 | Gresham et al. ........... 296/37.13 |

FOREIGN PATENT DOCUMENTS

| | | |
|---|---|---|
| DE | 102005057330 A1 | 6/2007 |
| DE | 602004009471 T2 | 7/2008 |
| DE | 102007061203 A1 | 6/2009 |
| EP | 1277613 A2 | 1/2003 |
| EP | 1431114 A2 | 6/2004 |
| JP | 2003048474 A | 2/2003 |
| JP | 2006001355 A | 1/2006 |
| WO | 2004024508 A2 | 3/2004 |

OTHER PUBLICATIONS

International Searching Authority, International Search Report for PCT Application No. PCT/EP2008/010099, dated Aug. 18, 2009.

USPTO, US Office Action issued in U.S. Appl. No. 12/487,471, dated Oct. 7, 2010.

Response to US Office Action for U.S. Appl. No. 12/487,471, dated Dec. 28, 2010.

USPTO, Notice of Allowance issued in U.S. Appl. No. 12/487,471, dated Feb. 2, 2011.

USPTO, Notice of Allowance issued in U.S. Appl. No. 12/487,471, dated Apr. 19, 2011.

* cited by examiner

RECEIVING ELEMENT, IN PARTICULAR FOR ACCOMMODATING A CONTAINER

CROSS-REFERENCE TO RELATED APPLICATIONS

This application is a U.S. National-Stage entry under 35 U.S.C. §371 based on International Application No. PCT/EP2008/010099, filed Nov. 28, 2008, which was published under PCT Article 21(2) and which claims priority to German Application No. 102007061203.8, filed Dec. 19, 2007, and German Application No. 102008029259.1, filed Jun. 19, 2008, which are all hereby incorporated in their entirety by reference.

TECHNICAL FIELD

The technical field relates to a receiving element, in particular for motor vehicles, with a housing open at the top for accommodating at least one container, wherein the housing has a floor and at least one lateral clamping element.

BACKGROUND

Receiving elements for accommodating one or several containers, also referred to as cup holders, are used in a variety of ways in motor vehicles. The cup holders are most often incorporated into the central console of the motor vehicle, in particular of the passenger car. In addition, the motor vehicle exhibits more trays.

The steadily increasing number of components to be accommodated inside of a vehicle, in particular in the area of the cockpit, is creating space problems during the accommodation of all these components.

A receiving element of the kind mentioned at the outset is known from EP 1 431 114 A2. It is used to accommodate a pot-shaped container, in particular a beverage can or bottle. The housing of the receiving element has a constant usable depth for the container. The housing incorporates several lateral clamping elements that can be pivoted around horizontal axes, which can pivot around horizontal axes and serve to radially clamp the container placed in the housing. When not in use, the clamping elements can be retracted completely into an annular space enveloping the receiving area of the housing, making it completely available as a receiving area.

A retractable and extendable receiving element for use in a motor vehicle that serves to accommodate two containers is known from DE 196 16 774 A1.

At least one object of the present invention is to further develop a receiving element of the kind mentioned at the outset so that it is suitable for establishing a relatively large, variable tray area on the one hand, and serves to reliably accommodate at least one container that can vary in size on the other. In addition, other objects, desirable features and characteristics will become apparent from the subsequent summary and detailed description, and the appended claims, taken in conjunction with the accompanying drawings and this background.

SUMMARY

This at least one object is achieved in a receiving element of the kind mentioned at the outset by virtue of the fact that the housing incorporates at least one foldable support, which in a first lockable position is spaced apart from and arranged parallel to the floor, and in a second position is arranged essentially perpendicular to the floor, and further that the respective clamping element is arranged above the support relative to its first position.

This configuration of the receiving element with the at least one foldable support makes it possible to form two support plates in the housing for the at least one container, wherein a space for accommodating objects is created underneath the support with the support in the first position.

If the foldable support is locked in its first position, wherein the support is placed underneath the upper end of the opening in the housing, a receiving space for the at least one container is created in the housing above the support. Another receiving space is then created underneath the support for one or more additional objects. By contrast, if the foldable support is in its second position, a receiving space with a larger installation depth is created, which hence extends from the upper end of the opening in the housing to the floor of the housing. In this case, the housing can accommodate a larger container as viewed in its extension perpendicular to the floor surface of the housing.

The at least one container is held by means of the at least one lateral clamping element. If only one clamping element is present, the container is held between it and the lateral wall of the housing facing away from the clamping element. The respective container is advantageously only clamped as described above by means of a clamping element, keeping the variety of parts low.

The respective container preferably involves bottles and cans, meaning in particular containers having an essentially rotationally symmetrical cross section.

An embodiment of the invention provides that the housing is used to accommodate two containers. These are best vertically aligned relative to their longitudinal extension, and situated next to each other.

The clamping element(s) used to position the respective container can best be fixed in their clamping position.

An embodiment of the invention provides that the foldable support exhibit a two-part design, wherein the two support sections can be pivoted up and/or down around horizontal axes in parallel lateral walls of the housing. This configuration of the support eliminates the need for significant installation space by the support section located in its second position in the vertical extension of the opening in the housing. On the other hand, the two-part configuration of the support increases the flexibility of the receiving element in terms of combining the function of cup holder and additional receiving space.

A further development provides that the two support sections be pivoted in the same longitudinal wall or different longitudinal walls of the housing. When one support section is in its first position, i.e., the horizontal position, and the other support section is in its second position, i.e., the vertically folded position, the space underneath the horizontally arranged support section can be used for accommodating objects, and a container can be placed on this support section, while the entire height of the opening in the housing is available for accommodating a larger container in the area of the vertically folded support section.

The respective container is preferably clamped in place using a single clamping element. The respectively used clamping element is designed in particular as a clamping arm that can pivot around a vertical axis. This yields a structurally especially simple configuration of the clamping element, while at the same time keeping the kinematics simple.

Another embodiment of the invention provides that the foldable support can pivot around an axis mounted in the housing, wherein the support exhibits two support sections pivoted to each other around an axis arranged parallel to the housing-side axis, wherein the two support sections are folded toward each other when moving the support from the first position into the second position.

Therefore, the section can be folded from its first position into its second position like a toggle lever. The support can be accommodated in the area of one side of the housing to save on space in its second position.

In the first position of the support, two support planes are formed in the housing for the at least one container. If the foldable support is in the first position and locked, wherein the support is placed underneath the upper end of the opening in the housing, a receiving space is formed above the support in the receiving area of the housing for the at least one container. Another receiving area is then created underneath the support for one or more additional objects. By contrast, if the foldable support is located in its second position, a receiving area with a larger installation depth is created, which hence extends from the upper end of the opening in the housing to the floor of the housing. In this case, the housing can accommodate a larger container as viewed in its extension perpendicular to the floor surface of the housing.

In relation to the orientation of the motor vehicle, the support sections arranged like a toggle lever are preferably folded toward the back into their second position. This movement of the support sections corresponds to the ergonomically favorable motion when the receiving element is arranged next to the vehicle passenger oriented in the traveling direction, in particular the driver.

In particular, the two support sections are pivotably coupled in such a way that the two support sections flatly abut each other in the second position of the support. This permits a very space-saving accommodation of the support in its second position within the housing.

From the standpoint of an ergonomically favorable accessibility of the housing, and hence the at least one container accommodated by the housing, it is regarded as especially advantageous for the support section pivoted in the housing to be pivoted in the second position of the support by an angle of up to approximately 120° relative to the position of this support section in the first position of the support. This slightly inclined position of the support section relative to the perpendicular in its second position allows a correspondingly inclined reaching into the housing in this area, making objects located inside the housing especially easily accessible.

The pivoting axis of the two support sections is preferably arranged at a greater distance from the floor in the second position of the support than in the first position of the support. As a consequence, the two support sections are preferably tilted up proceeding from the flat location in the first position of the support. In the second position of the support, the support sections are hence situated closer to the housing opening, and thus especially easy to grasp when switching the support back to the first position.

In particular to ensure a structurally especially favorable manufacturing process and minimize the variety of parts, it is provided that the two support sections be essentially identical in design.

In order to be able to easily and reliably grasp the support, an advantageous further development of the invention provides that at least one of the support sections exhibits a recess open toward the pivoting axis of the two support sections or toward the housing. In the region where the support can be kinked, or in the region of the free end of the support, it therefore becomes possible to grasp and pivot one of the support sections, whether it be from the first position into the second position, or from the second position into the first position.

The at least one container is held by means of the at least one lateral clamping element. In this respect, the invention proposes that the housing have an upper frame, in particular one that can be clamped with the housing section exhibiting the floor and walls of the housing. The frame preferably exhibits the at least one lateral clamping element, which is especially elastic. If the frame can be joined with the housing section via clamping, the frame with the clamping element can be removed from the housing section. Such an application is indicated in cases where containers accommodated by the housing need not be fixed in place.

Therefore, a receiving element is proposed, in particular for motor vehicles, which is distinguished by a higher flexibility and hence an enhanced value of the product. With respect to the flexibility of the receiving element, the basic possible uses are as follows:

Use as a large tray, meaning a support in the second position, wherein objects can be placed on the floor of the housing, Use as an intermediate shelf in the form of a support located in the first position, on which objects can be placed, wherein valuable or less often used objects can be stored in the lowermost plane formed by the housing floor, Use as a cup holder, in particular for two containers, which can be placed on the support located in the first position, wherein the intermediate shelf formed by the support covers objects positioned underneath the intermediate shelf, Use as a cup holder, with a support section or both support sections folded up for accommodating one or two containers, in particular bottles, Combined use of cup holder and tray.

The mentioned flexibility is achieved without removing a section or having to dismantle the receiving element.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
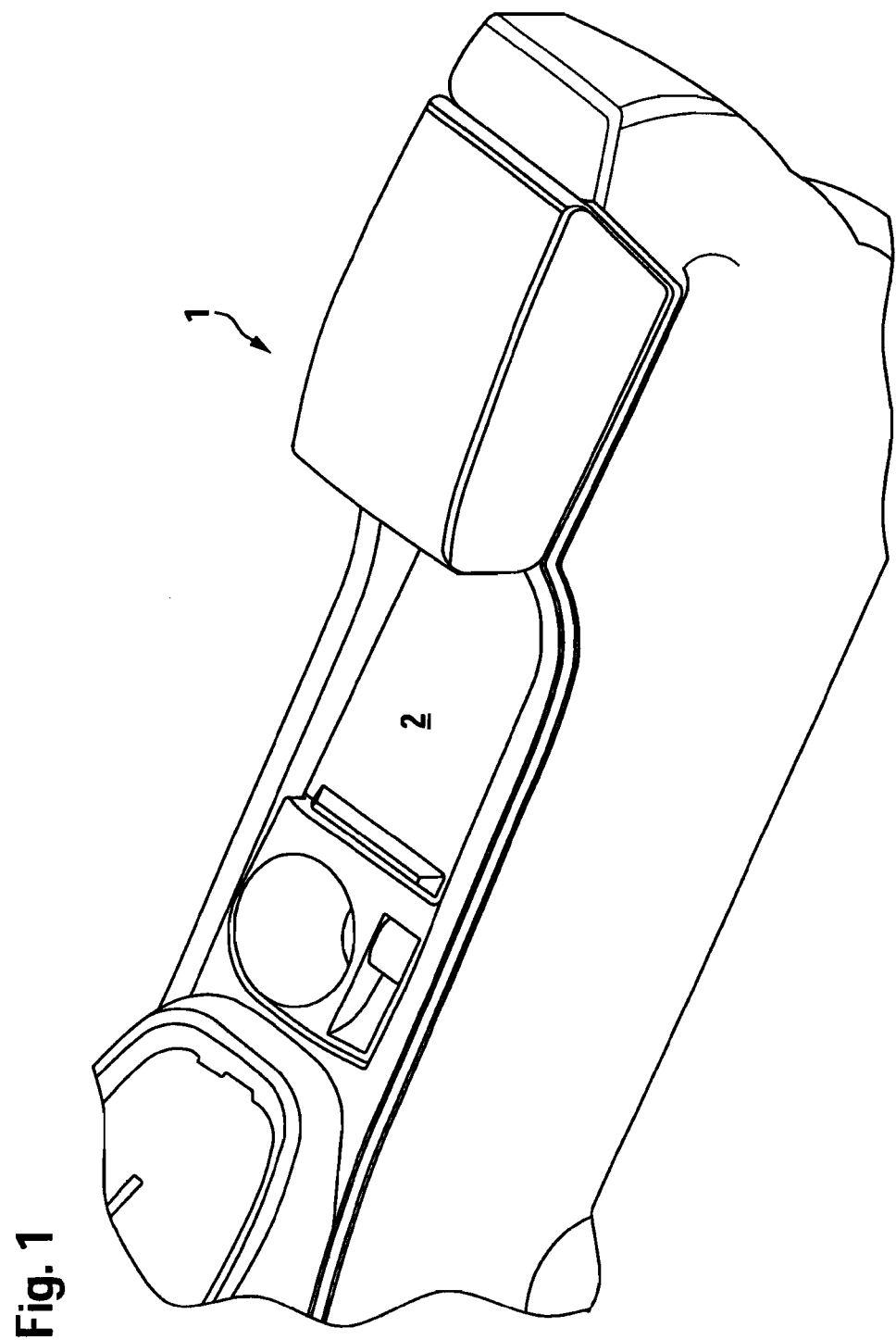
FIG. 1 for the first embodiment of the invention is a section of a central console of a passenger car, with the housing of the receiving element closed by means of a roller blind.

The following detailed description is merely exemplary in nature and is not intended to limit application and uses. Furthermore, there is no intention to be bound by any theory presented in the preceding background or summary or the following detailed description.

The first exemplary embodiment according to FIG. 1 to FIG. 5 shows a section of a central console 1 with a horizontally sliding roller blind 2, which is located above the receiving element 3 according to the invention situated in the central console. In the position shown on FIG. 1, the roller blind 2 covers the opening 4 of the housing 5 of the receiving element 3; the roller blind 2 shown on FIGS. 2 to 5 has been shifted to a position that uncovers the opening 4.

The receiving element 3 is designed as a module, and hence can be inserted into an opening in the central console 1, depending on the equipment included in vehicle. The housing 5 of the receiving element 3 is box-shaped, with a front end wall 6, a rear end wall located parallel thereto and not visible, the lateral walls 7 and 8 that join the two end walls and are arranged parallel to each other, and the horizontally arranged floor 9. The lateral walls 7 and 8 extend in a longitudinal direction of the central console 1, and represent the longitudinal lateral walls of the housing 5.

At roughly half the height of the housing, a support section 10 adjacent to the end wall 6 in the lateral wall 7 is mounted in the lateral wall 7 so that it can pivot around a horizontal axis. The support section 10 is locked in the horizontal position, specifically abutting a stop of the lateral wall 7. The support section 10 can be folded up from the horizontal position into a vertical position. Correspondingly, an identical support section 11 is mounted in the lateral wall 8 adjacent to the rear end wall of the housing 5 (not shown) at half the height of the housing 5 so that it can pivot around a horizontal axis in the lateral wall 8. In its horizontal position, the support section 11 abuts a stop of the lateral wall 8, meaning that it cannot be pivoted down any further. Proceeding from this position, this support section 11 can be folded up into its vertical position, in which it abuts the lateral wall 8.

A pivot arm 13 is mounted opposite the support section 10 in the lateral wall 8 at roughly half its length so that it can pivot around a perpendicular axis 12. This pivot arm 13 extends to nearly the end wall 6. Accordingly, a pivot arm 14 can pivot around a vertically arranged pivoting axis 15 on the side opposite the support section 11. In its position adjoining the lateral wall 7, this pivot arm 14 extends to nearly the rear end wall of the housing 5 (not shown).

The two pivot arms 13 and 14 are positioned in such a way as to be located slightly above the support sections 10 and 11 with the support sections 10 and 11 horizontally arranged.

Figure 2:
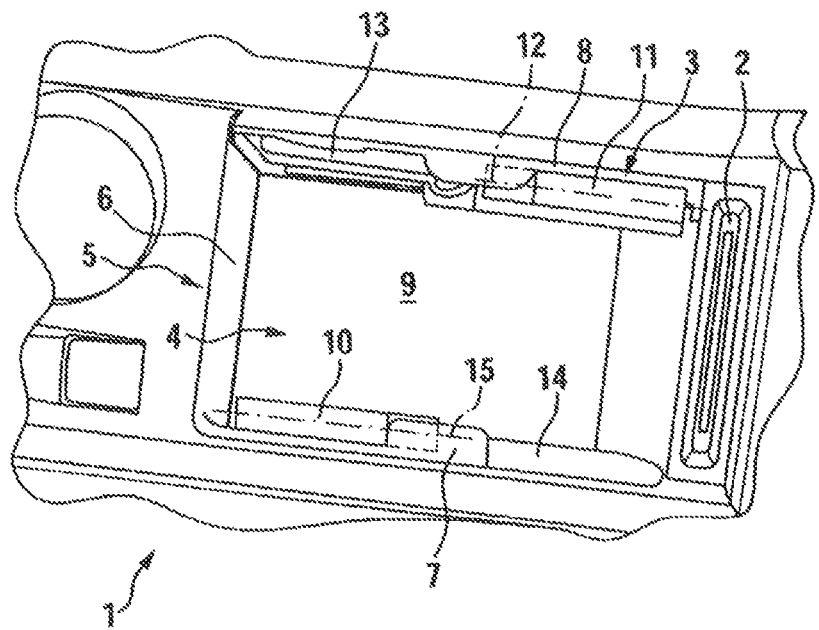
FIG. 2 is a section of the central console according to FIG. 1, with the roller blind open and support sections folded up against the longitudinal lateral walls of the housing, as well as clamping elements pivoted against the longitudinal lateral walls.

Based on this described configuration, the receiving element 3 can be used to establish various functional states, which are explained on FIG. 2 to FIG. 5:

FIG. 2 shows the functional state of the receiving element 3, in which the housing 5 as a whole serves as the receiving area for one or more containers. The interior space of the housing 5 is not divided. The two clamping arms 13 and 14 are pressed against the lateral walls 8 and 7 allocated thereto, and the two support sections 10 and 11 are folded up, a position in which they also abut the lateral walls 7 and 8.

Figure 3:
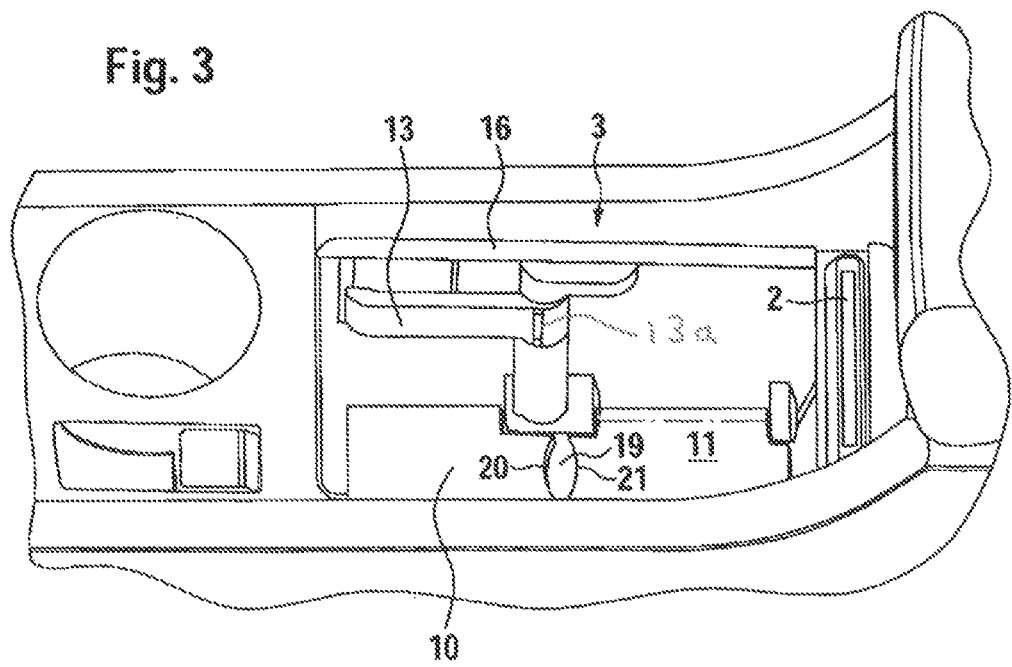
FIG. 3 is a view according to FIG. 2, with support sections folded out, and hence horizontally arranged, and clamping elements still pivoted against the lateral walls of the housing.

FIG. 3 shows the functional state of the horizontally arranged support sections 10 and 11 with the clamping arms 13 and 14 in an unchanged position from FIG. 2. This provides a receiving area above the support sections 10 and 11 for objects or two containers, such as cans or bottles, wherein containers with a relatively small height should be used given the reduced height of the housing 5 between the support sections 10 and 11 located in this position and the upper limit of the housing opening 4, as represented by the upper edge 16 of the housing. The space between the two support sections 10 and 11 and the floor 9 of the housing 5 is in this case used for accommodating additional objects.

Figure 4:
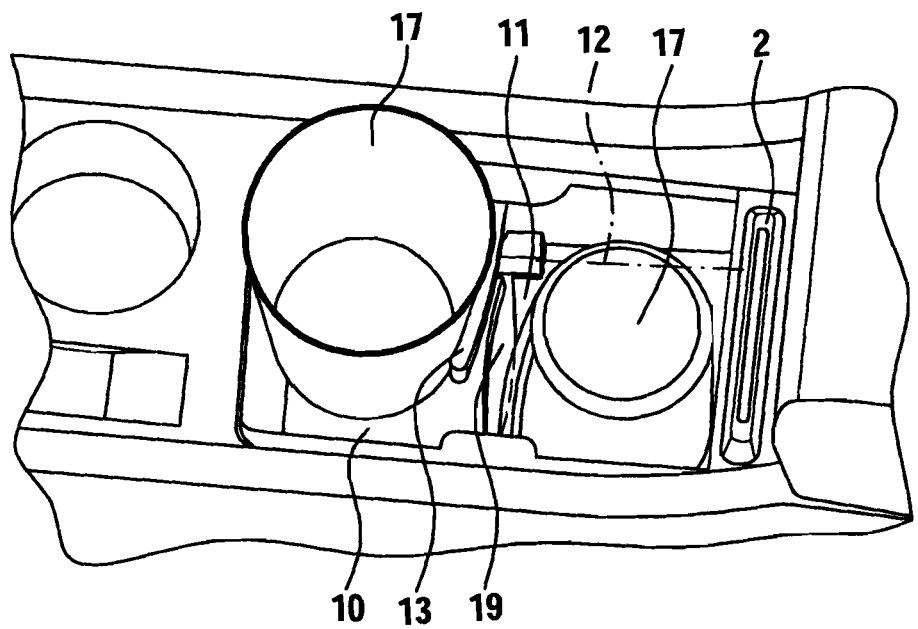
FIG. 4 is a view according to FIG. 2 and FIG. 3, with one support section located in the first position, with container situated thereupon, which is laterally clamped by means of a clamping element, as well as with the other support section located in the second position, and clamping element there moved against the lateral wall, wherein the container is placed on the housing floor.

The functional state according to FIG. 4 shows only the support section 10 in its horizontal position. A container 17, a cup in this specific case, is placed on the support section 10. The pivot arm 13 is pivoted out, and clamps the container 17 between itself and the front end wall 6. The other support section 11 is folded into its vertical position against the lateral wall 8, and the clamping arm 14 is also pivoted against the lateral wall 7, so that the rear half of the housing 5 can serve to accommodate a container 17 sitting on the floor 9 of the housing 5. Given the entire available height of the housing 5, this container 17, for example a bottle or can, can exhibit a clearly greater longitudinal extension than the container 17 resting on the support section 10.

Figure 5:
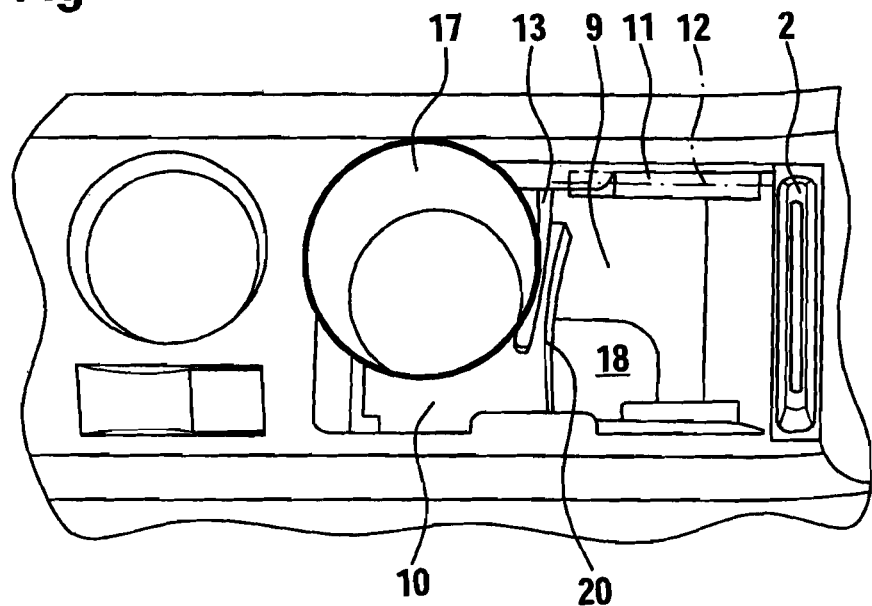
FIG. 5 is a view according to FIG. 4, wherein no container is placed on the housing floor, but rather a cell phone is placed on the floor, which also occupies the storage area under the support section located in the first position.

FIG. 5 illustrates a functional state in which the support section 10, clamping arm 13, support section 11 and clamping arm 14 are in the same position, as depicted on FIG. 4. However, the rear half of the housing 5 does not accommodate a container 17 in this case, but rather the space underneath the support section 10 and the free rear space of the housing over the entire height of the housing 5 are used to accommodate an object. Shown here is a cell phone 18 lying on the floor 9 of the housing 5, which essentially extends over the entire length of the floor 9.

The clamping arms 13 and 14 illustrated for the described embodiment are pre-stressed by springs 13a to act on the container allocated to the respective clamping arm. Particularly advantageous is an initial position of the clamping arm 13 that assumes an angle of about 60 relative to the allocated lateral wall, with an orientation toward the end wall between which and the clamping arm the container is to be clamped. When a container is introduced from above between the clamping arm and end wall, the clamping arm is pivoted further against the force exerted by the spring, increasing the angle in relation to the prescribed 60 angle. By moving past a detent, the clamping arm can be moved toward the allocated lateral wall, into the folded in position depicted on FIG. 2.

Offsetting the pivoting axes 12 and 15 relative to the longitudinal extension of the housing 5 makes it possible to optimize the angle of attack of the respective clamping arm in relation to the container, and this offset further ensures that the slit 19 formed between the two horizontally arranged support sections 10 and 11 extends over as large a width of the housing 5 as possible, essentially up to the lateral walls 7 and 8 of the housing. If the facing sides 20 and 21 of the horizontally arranged support section 10 and horizontally arranged support section 11 are curved away from each other, a relative wide slit results, for example which is 20 mm wide at the broadest location, so that the respective support section 10 or 11 can be favorably grasped in this region for pivoting purposes. On the other hand, this inwardly directed curvature of the sides 20 and 21 makes it possible to accommodate a container with a larger diameter if only one support section 10 or 11 is in the horizontal position.

Figure 6:
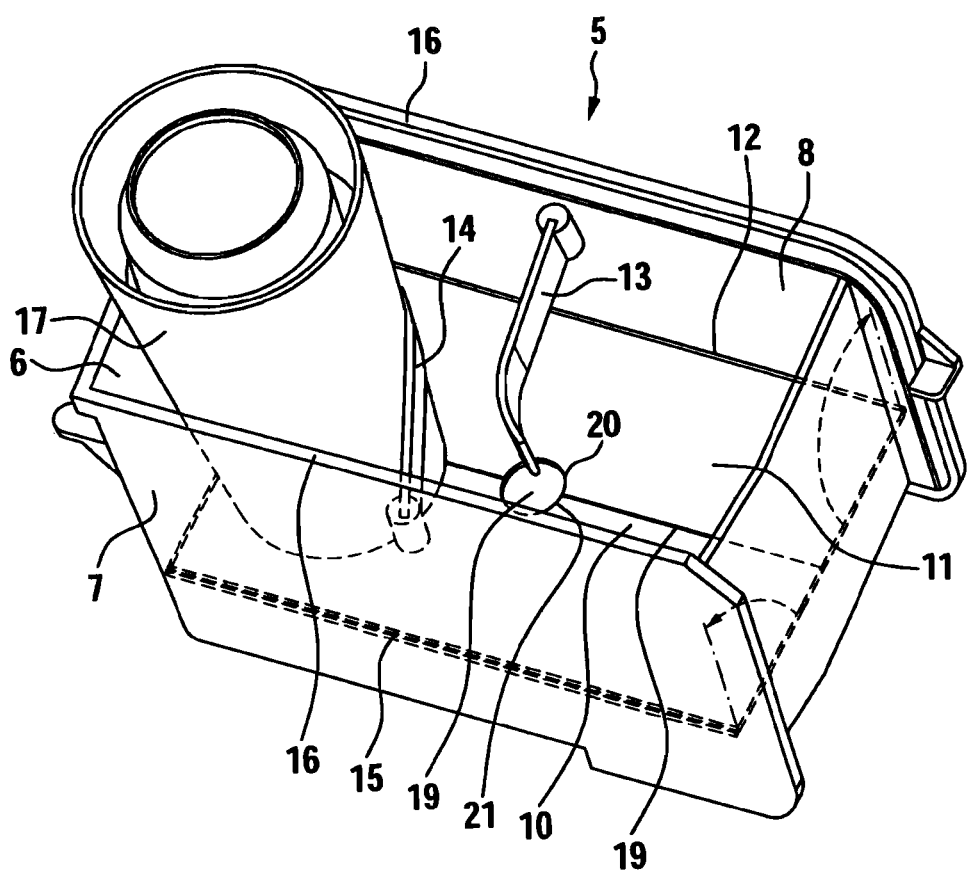
FIG. 6 is a spatial view of a second exemplary embodiment, with both support sections located in the first position, wherein the gap formed between the latter runs in the longitudinal direction of the housing, as opposed to the gap configuration according to the embodiment on FIG. 1 to FIG. 5, transverse to the longitudinal extension of the housing.
Figure 7:
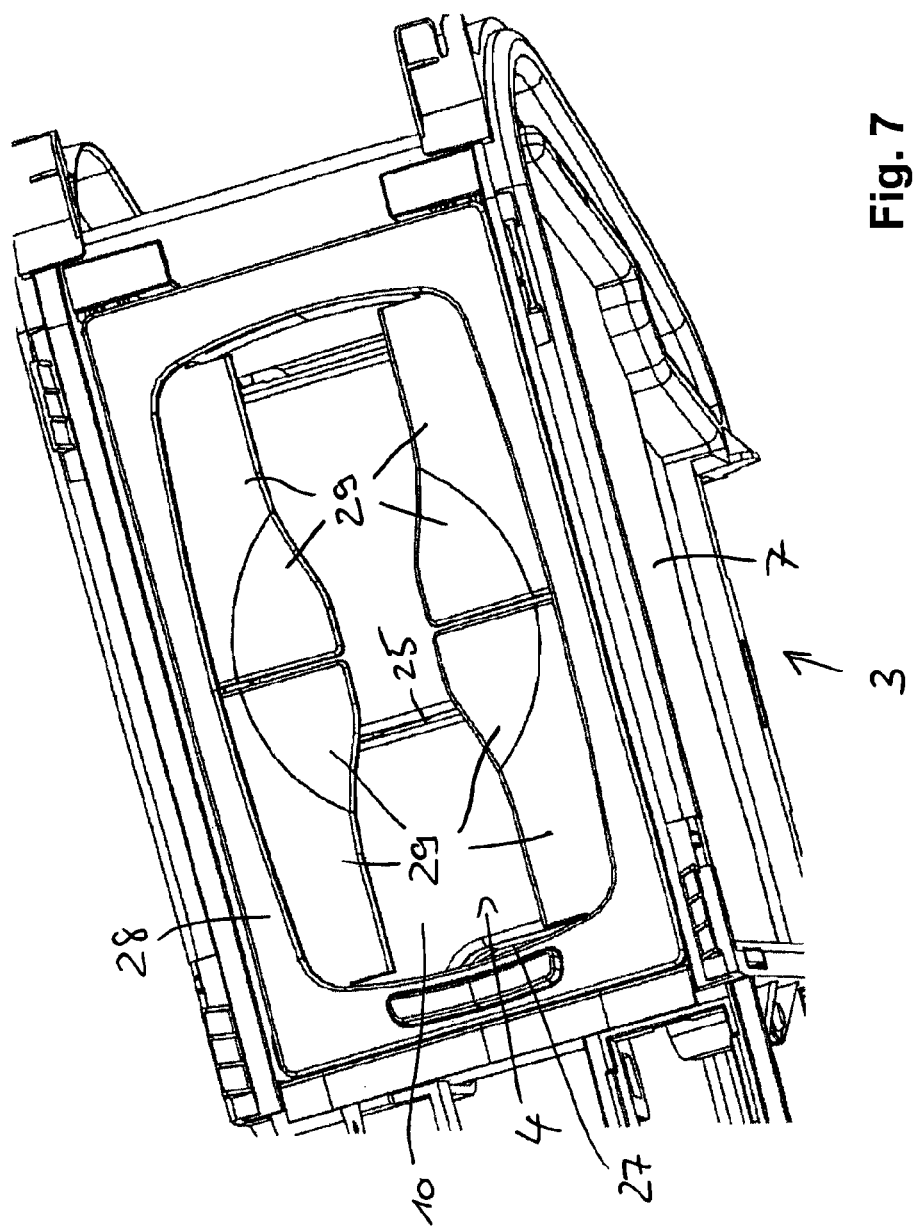
FIG. 7 for a third embodiment of the invention is a section of the central console according to FIG. 1, with the roller blind open and support located in the first position, viewed at an inclination from above.
Figure 8:
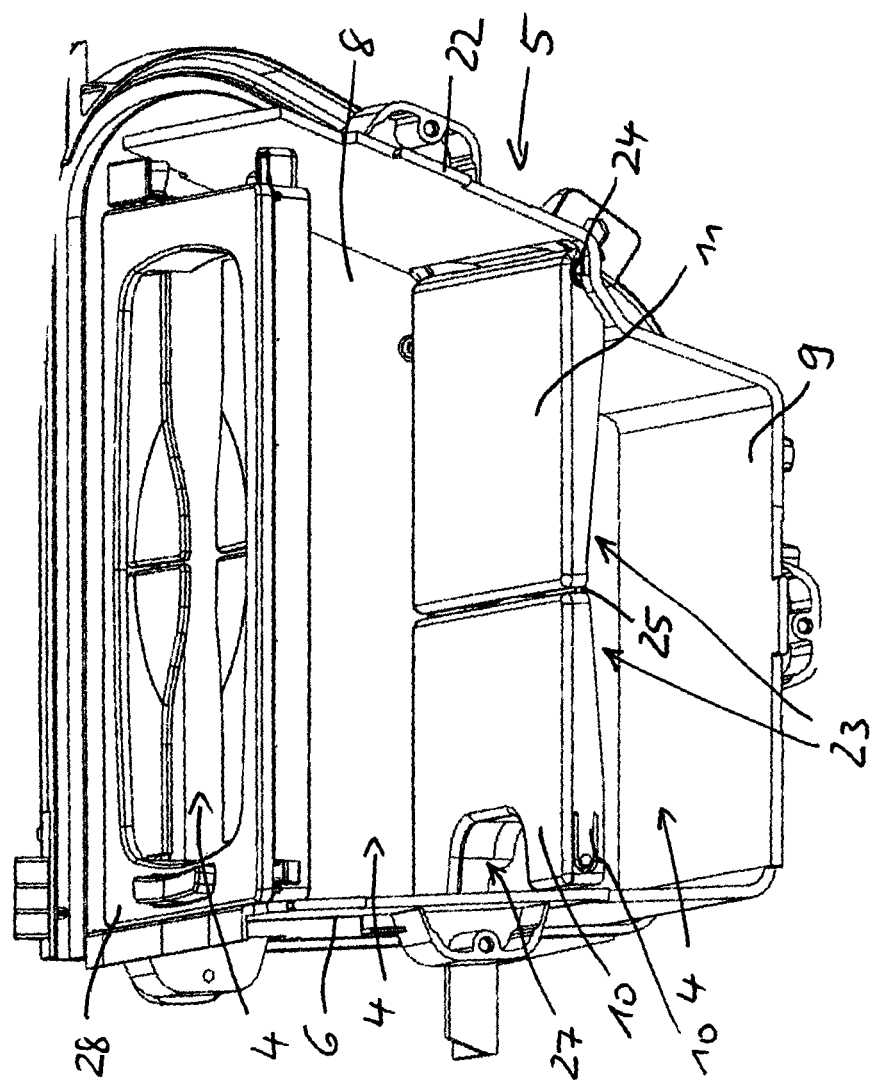
FIG. 8 is a spatial view section of the central console depicted on FIG. 7, viewed at an inclination from the side.
Figure 9:
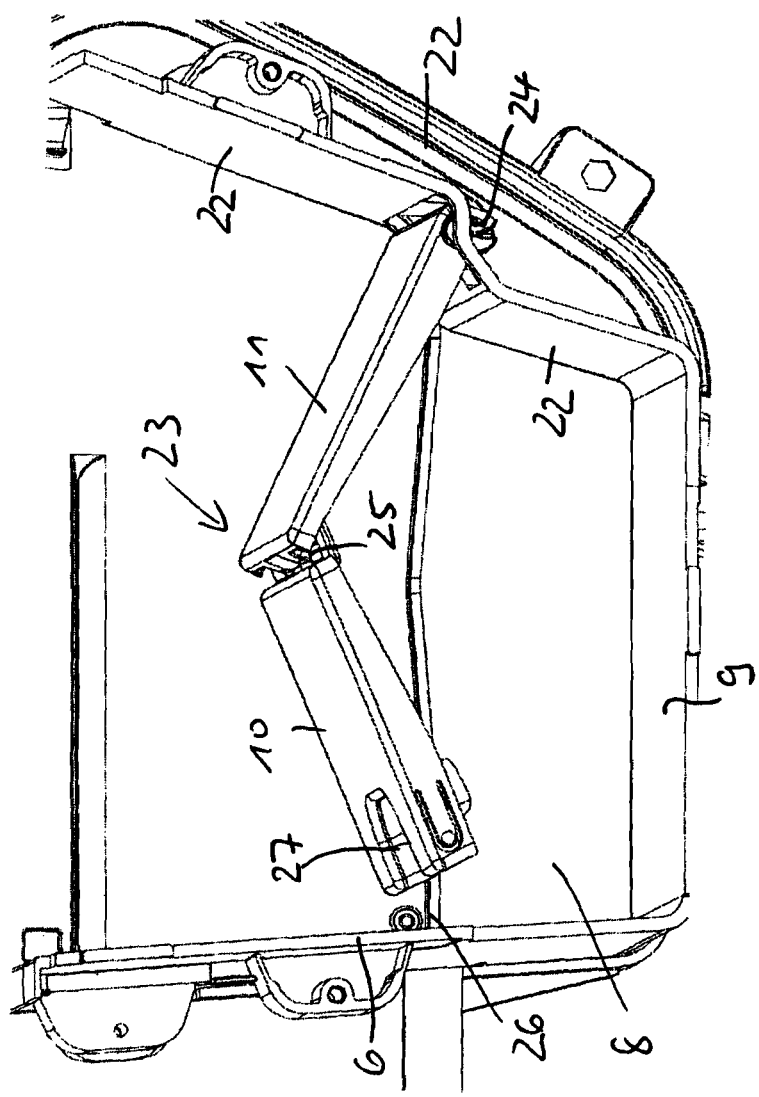
FIG. 9 is the section of the central console depicted on FIG. 8, in an intermediate position of the support, viewed at an inclination from the side.
Figure 10:
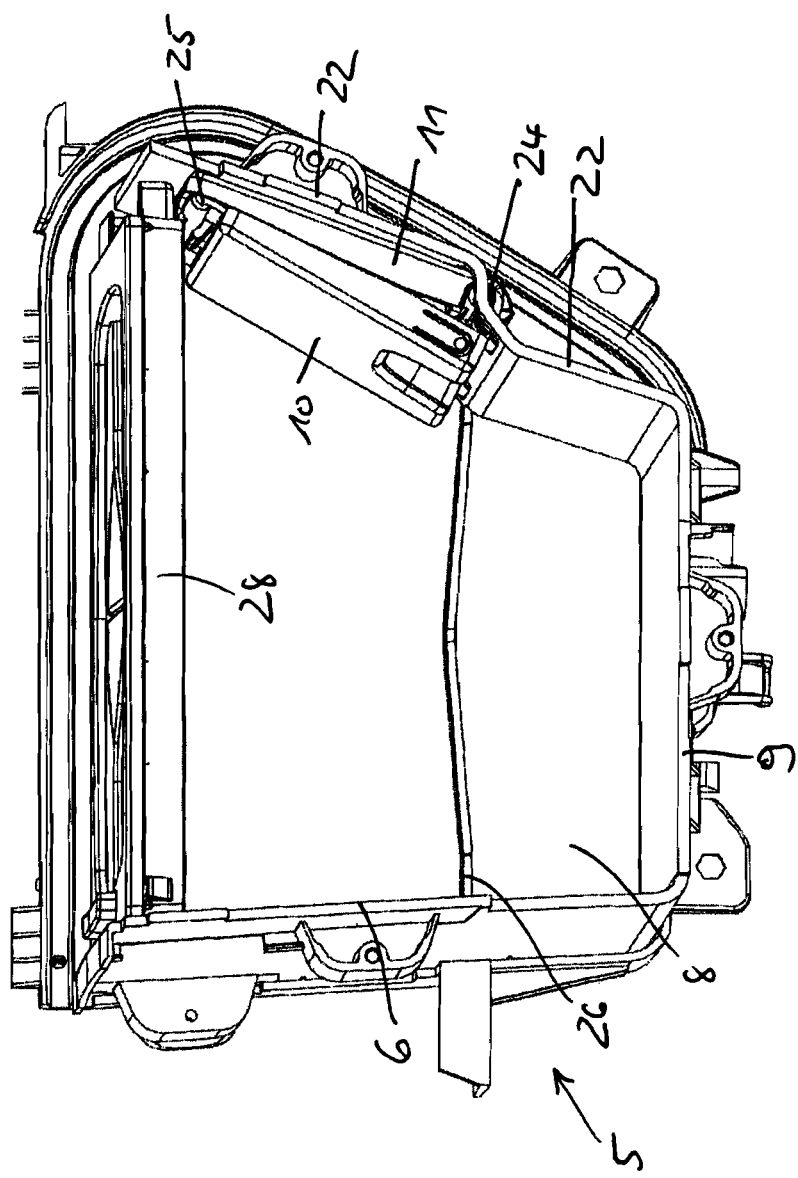
FIG. 10 is the section of the central console depicted on FIG. 8 and FIG. 9, with the support completely folded together, and viewed at an inclination from the side.

In terms of the second exemplary embodiment, FIG. 6 shows a modification of the housing 5 in which the support section 10 does not extend over essentially the entire width of the interior space of the housing 5 as in the exemplary embodiment according to FIGS. 1 to 5, but rather over only nearly half the width of the interior space of the housing 5. In the exemplary embodiment according to FIG. 6, the support section 10 extends over nearly the entire length of the interior space of the housing 5, and the other support section 11 accordingly extends over nearly half the width of the interior space of the housing 5, and over nearly the entire length of the interior space of the housing 5. As a consequence, there is a separation between the two support sections 10 and 11 in the longitudinal direction of the housing 5 in the exemplary embodiment according to FIG. 6 in relation to the horizontal arrangement of the two support sections 10 and 11 that between them form the slit 19 running in the longitudinal direction of the housing 5.

In terms of the further structural configuration and function of the exemplary embodiment, reference is made to the above statements regarding the first exemplary embodiment. Parts corresponding with the first exemplary embodiment are given the same reference numbers for the second exemplary embodiment.

The third embodiment according to FIG. 1 and FIGS. 7 to 10 will be described below:

FIG. 1 illustrates a section of a central console 1 with a horizontally shifting roller blind 2, which is located above the receiving element 3 according to the invention mounted in the central console 1. In the position shown on FIG. 1, the roller blind 2 covers the opening 4 of the housing 5 of the receiving element 3; FIGS. 7 to 10 do not depict the roller blind 2.

With respect to the details concerning the third embodiment described below, reference is made to FIG. 7 to FIG. 10:

The receiving element 3 is designed as a module, and as such can be inserted into an opening in the central console 1, depending on the equipment included in the vehicle. The housing 5 of the receiving element 3 has a box-like design, with a front end wall 6 extending perpendicular to the floor 9 of the housing, a rear end wall 22 extending at an angle of roughly 110° to the floor 9, lateral walls 7 and 8 further perpendicular to the front end wall 6, which join the two end walls 6 and 22 with each other.

A foldable support 23 is arranged inside the housing 5. It is formed by two plate-shaped support sections 10 and 11. The support section 11 can be pivoted around an axis 24 mounted in the rear lateral wall 22. This axis 24 is arranged parallel to the floor 9, and situated at slightly under half the height of the housing 5. The end of the support section 11 facing away from the axis 24 is pivoted to the other support section 10 via an additional axis 25. As opposed to the axis 24, which is arranged in the upper region of the support section 11, the pivoting axis 25 is located between the two support sections 10 and 11 in the lower region of the support sections 10 and 11 in relation to their extended arrangement corresponding to the first position of the support 23. In this first horizontal position of the support 23 arranged parallel to the floor 9, the support section 10 abuts a stop 26 of the front end wall 6 in the region of its end facing away from the axis 25. In this position, the facing front surfaces of the support sections 10 and 11 contact each other above the axis 25, so that this extended position of the support 23 represents its lower end position.

The support 23 can be folded into the end position also depicted on FIG. 5 like a toggle lever via the intermediate position illustrated on FIG. 4. In this end position, which corresponds to the second position of the support 23, the support section 11 abuts the rear end wall 22, and the support section 10 is folded against the support section 11. In this second position, the axis 25 is positioned slightly under the roller blind 2.

The support 23 can be folded especially easily if in particular the support section 10 exhibits a recess 27 open toward its free end, through which this support section 10 can be grasped and in particular moved from the first position into the second position of the support 23. The support 23 is moved from the second position into the first position either manually, or latching means are provided for fixing the support 23 in the second position, which receive the support 23 in this position with a pre-stressed spring, wherein the support 23 is moved to its first position by the action of the spring when the detent is manually released.

The housing 5 has an upper frame 28, which can be clamped with the housing section exhibiting the floor 9 and walls 6, 7, 8 and 22 of the housing 5. The frame 28 takes up several lateral clamping elements 29, which extend parallel to the floor 9 and extend into the open space of the frame 28. These clamping elements 29 are lip-shaped and elastic. As a result, these clamping elements 29 can be used to securely hold one or more containers in the receiving element 3.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A console for receiving a beverage container in a element for motor vehicle, comprising:
   a housing open at a top that is configured to accommodate at least one container;
   a housing floor;
   a foldable support which in a first lockable position is spaced apart and arranged substantially parallel to the housing floor, and in a second position is arranged essentially perpendicular to the housing floor; and
   a clamping element configured to secure the container within the console, said clamping element positioned above the foldable support relative to the first lockable position;
   wherein the foldable support comprises two support sections, each configured to pivot around respective horizontal axes disposed at substantially parallel to opposing lateral walls of said housing.

2. The receiving element according to claim 1, wherein said housing is configured to accommodate a second container.

3. The receiving element according to claim 1, wherein said container is held with the clamping element between a wall of said housing.

4. The receiving element according to claim 1, wherein said clamping element is pre-stressed in a clamping position.

5. The receiving element according to claim 1, wherein said two support sections form a slit in the first lockable position.

6. The receiving element according to claim 5, wherein said two support sections extend essentially over a length of a receiving area formed in said housing.

7. The receiving element according to claim 6, wherein said slit extends essentially over an entire width of said housing.

8. The receiving element according to claim 5, wherein said slit formed between said two support sections in the first lockable position is wider in a middle region than in a region of ends.

9. The receiving element according to claim 1, wherein said clamping element is a clamping arm that is configured to pivot around a vertical axis.

\* \* \* \* \*